United States Patent [19]

Shinno et al.

[11] Patent Number: 5,011,563
[45] Date of Patent: Apr. 30, 1991

[54] AUTOMATIC TAPE AFFIXING APPARATUS

[75] Inventors: Nobuo Shinno; Yasuhiro Ohnishi, both of Osaka, Japan

[73] Assignee: Shinnippon Koki Kabushiki Kaisha, Osaka, Japan

[21] Appl. No.: 351,681

[22] Filed: May 15, 1989

[30] Foreign Application Priority Data

May 18, 1988 [JP] Japan ................................ 63-122811

[51] Int. Cl.⁵ ............................................. B32B 31/00
[52] U.S. Cl. .................................... 156/574; 156/353; 156/523; 156/358
[58] Field of Search ............... 156/353, 355, 433, 523, 156/574, 575, 576, 358

[56] References Cited

U.S. PATENT DOCUMENTS

3,775,219  11/1973  Karlson et al. ................... 156/363
4,627,886  12/1986  Grone et al. ..................... 156/523 X
4,750,965  6/1988   Pippel et al. ..................... 156/514 X

Primary Examiner—David A. Simmons
Assistant Examiner—James J. Engel, Jr.
Attorney, Agent, or Firm—Jordan and Hamburg

[57] ABSTRACT

An automatic tape affixing apparatus includes a tape affixing head movable in X-axis, Y-axis, Z-axis, A-axis and C-axis directions; a tape presser roller having a plurality of roller members disposed widthwise; a roller supporting shaft for supporting the roller members in such a way that the roller members are rotatable and vertically movable independently of one another; first cylinder means including a plurality of cylinders for providing pressing force to the respective roller members through bearings so that the roller members are pressed against an adhesion form; a roller carrying member supported movably in a vertical direction by said tape affixing head for supporting the first cylinder means and said roller supporting shaft; and second cylinder means supported by the tape affixing head for providing pressing force to the roller carrying member, whereby, a tape can be affixed on a curved surface of the adhesion form by vertically moving roller members independently of one another, and also an end portion of the tape having an end edge inclined to the tape affixing direction can be effectively and assuredly affixed by moving only required roller members in the vertical direction.

16 Claims, 8 Drawing Sheets

AUTOMATIC TAPE AFFIXING APPARATUS

BACKGROUND OF THE INVENTION AND RELATED ART STATEMENT

The present invention relates to an apparatus for automatically affixing a tape of composite material onto the surface of an adhesion form having various contours to make a lamination of the tape.

In recent years, lightweight plate materials have been produced from a tape of composite material, i.e. a tape prepared by impregnating carbon fiber, aramid fiber or like reinforcing fiber with a thermosetting resin, by affixing the tape on the surface of an adhesion form (body) having specified contours to make a lamination, and thereafter subjecting the lamination to a curing treatment with application of heat and pressure. U.S. Pat. No. 4,292,108, for example, discloses an apparatus for automatically affixing a tape of composite material. According to this disclosure, a tape is continuously fed from a reel and pressed against the surface of the adhesion form with a presser roller, the presser roller is moved along a predetermined path to successively affix the tape strips without leaving a clearance therebetween. The presser roller consists of a plurality of roller members disposed widthwise. These roller members are permitted to vertically move independently of one another so that even when an end edge of a tape strip is inclined to a tape affixing direction, the very tip of the end edge can be pressed and affixed to the adhesion form.

In the above conventional apparatus, a link roller is used to give a pressing force to the presser roller. The presser roller, when releasing the pressing force of the link roller, moved up due to a spring carrier by the presser roller and the pressing force to the tape disappears. Consequently, the above conventional apparatus is satisfiable in the case of affixing the tape to a flat surface but unsatisfiable in the case of an adhesion form having a curved surface.

SUMMARY OF THE INVENTION

The present invention has worked out to overcome the above-mentioned drawbacks. It is an object of the present invention to provide an automatic tape affixing apparatus which can assuredly affix a tape on an adhesion form having uneven curved surfaces and also affix even a tape having an end edge inclined to a tape affixing direction, to the very tip of the end edge on the adhesion form.

An automatic tape affixing apparatus comprising; a tape affixing head movable in X-axis, Y-axis, Z-axis, A-axis and C-axis directions; a tape presser roller having a plurality of roller members disposed widthwise; a roller supporting shaft for supporting the roller members in such a way that the roller members are rotatable and vertically movable independently of one another; first cylinder means including a plurality of cylinders for providing pressing force of the respective roller members through bearings so that the roller members are pressed against an adhesion form; a roller carrying member supported movably in a vertical direction by said tape affixing head for supporting the first cylinder means and the roller supporting shaft; and second cylinder means supported by the tape affixing head for providing pressing force to the roller carrying member.

According to the present invention, also an automatic tape affixing apparatus further comprises a weight canceling cylinder supported by the tape affixing head for providing force to the roller carrying member in the reverse direction of the first cylinder means so as to cancel the weight of the roller carrying member.

Further, in an automatic tape affixing apparatus of the present invention, the second cylinder means including a plurality of cylinders, the roller members, the cylinders of the first cylinder means and the cylinders of the second cylinder means being disposed in series, the cylinders of the first cylinder means and the cylinders of the second cylinder means being cooperable.

Accordingly, a tape can be affixed on a curved surface of the adhesion form by vertically moving roller members independently of one another, and also an end portion of the tape having an end edge inclined to the tape affixing direction can be effectively and assuredly affixed by moving only required roller members in the vertical direction.

DETAILED DESCRIPTION OF PREFERRED EMBODIMENTS

Figure 2:
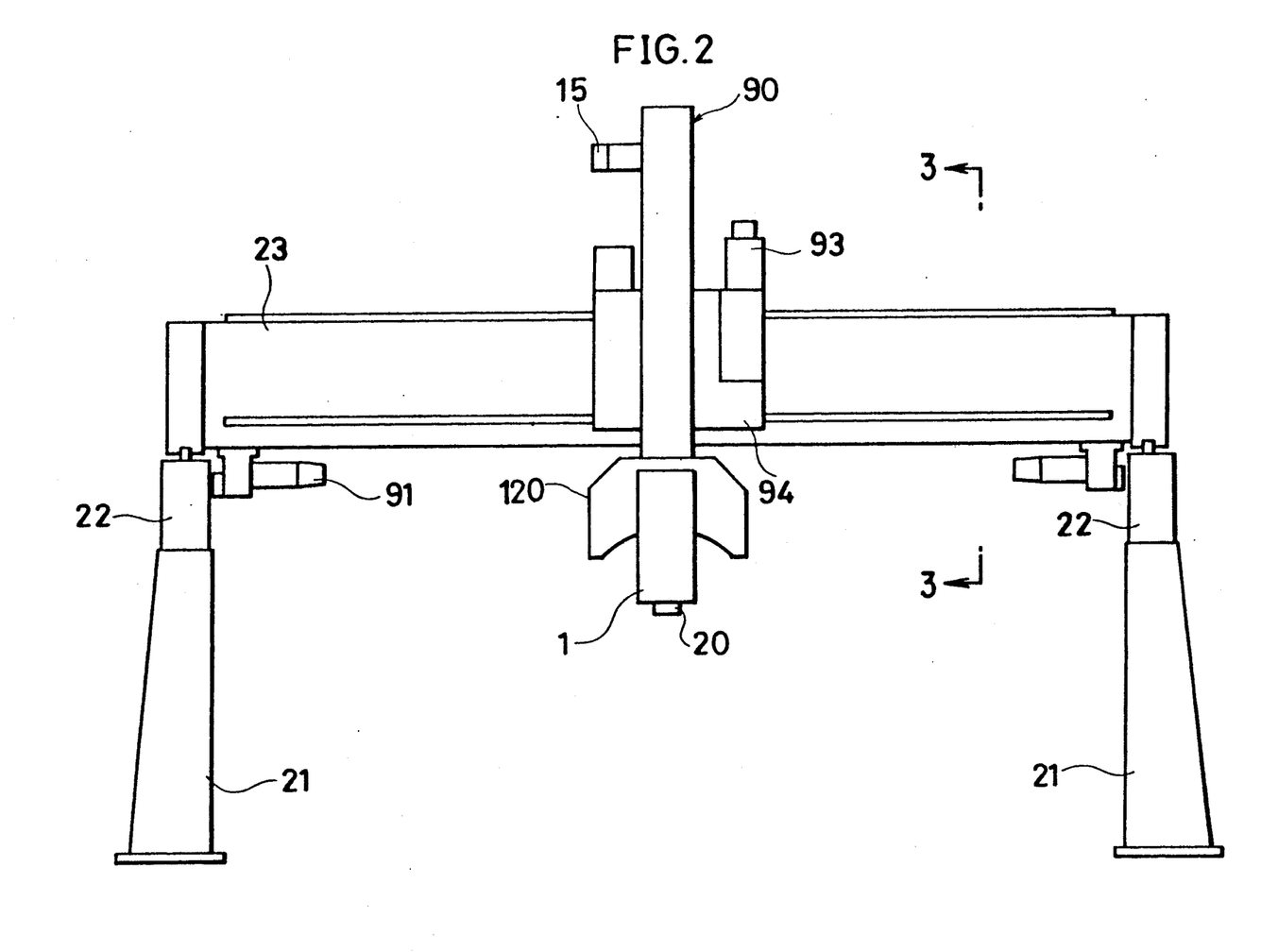
FIG. 2 is an overall schematic elevational view showing the apparatus according to the present invention.
Figure 3:
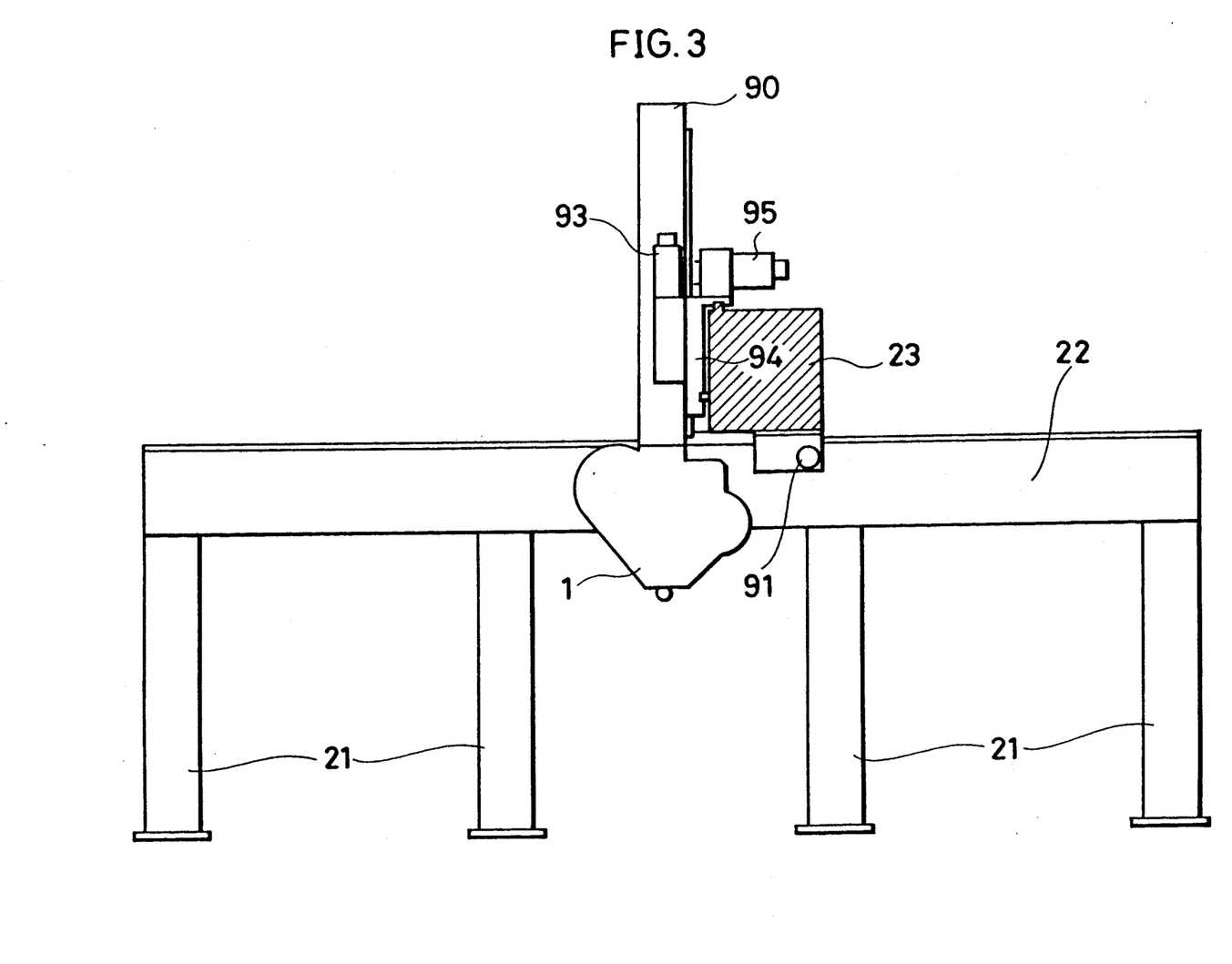
FIG. 3 is a sectional view taken along the line 3—3 in FIG. 2.

With reference to FIGS. 2 and 3, a pair of side rails 22 supported by columns 21 are arranged in parallel to each other. A cross rail 23 extends between and is supported by the side rails 22. The cross rail 23 is movable on the side rails 22 by an X-axis servomotor 91 in the direction of X axis (perpendicular to the plane of FIG. 2). A Y-axis saddle 94 mounted on the cross rail 23 is movable by a Y-axis servomotor 93 along the cross rail 23 in the direction of Y-axis (laterally in FIG. 2). A Z-axis saddle 90 mounted on the Y-axis saddle 94 is movable by a Z-axis servomotor 95 in the direction of Z axis (vertically).

A head saddle 120 is attached to a lower portion of the Z-axis saddle 90 with rotatable about C axis (an axis for rotation about Z axis) and driven by a C axis servomotor 15. The head saddle 120 holds a tape affixing head 1 pivotably about A axis (an axis for pivot about X axis, or an axis for leftside and rightside pivots in FIG. 2) and driven by an A axis servomotor 121.

Figure 4:
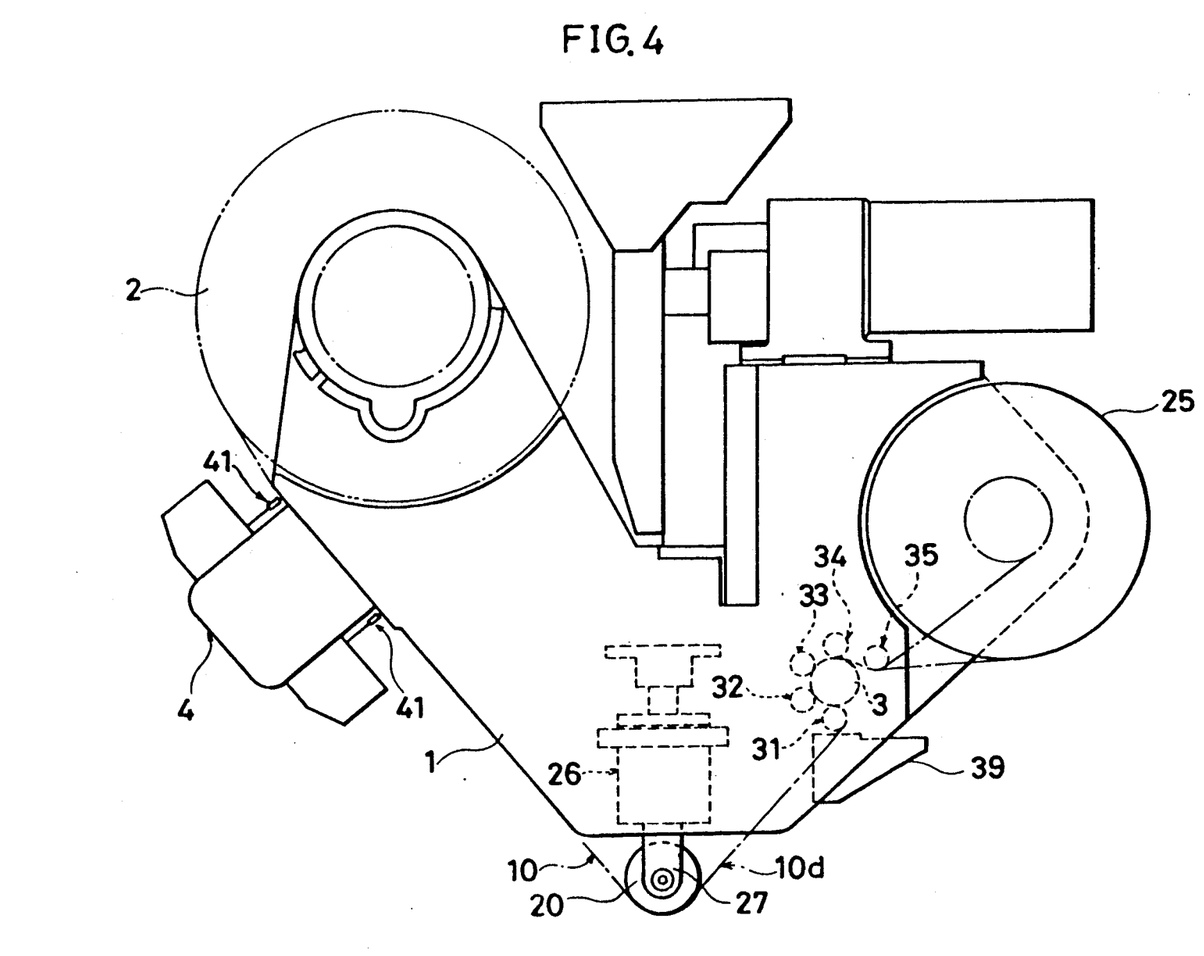
FIG. 4 is a side view showing a tape affixing head of the apparatus.

As shown in FIG. 4, the tape affixing head 1 is provided with a tape supply reel 2 and a take-up reel 25. The tape supply reel 2 carries a roll 10 of double layer tape consisting of composite tape and backing paper and the take-up reel 25 winds up only the backing paper 10d. The tape 10 paid off from the reel 2 is cut at a predetermined length by cutters 41 of a tape cutting device 4 with the backing paper being not cut. In other words, composite tape only is cut. Cut-off strips of the composite tape are then pressed on an adhesion form by a presser roller 20, and the backing paper 10d is run around a drive roller (pinch roller) 3 and then wound on the take-up reel 25. Reference numeral 39 designates a scrap tape collection box.

The presser roller 20 is held by a bracket 27 of a roller carrying device (holding means) 26 attached to the tape affixing head. A plurality of driven rollers 31, 32, 33 and 34 are disposed around the drive roller 3, each of which presses the backing 10d against the peripheral surface of the drive roller 3. An auxiliary roller 35 defines the taking-up direction of the tape 10 from the drive roller 3.

Figure 5:
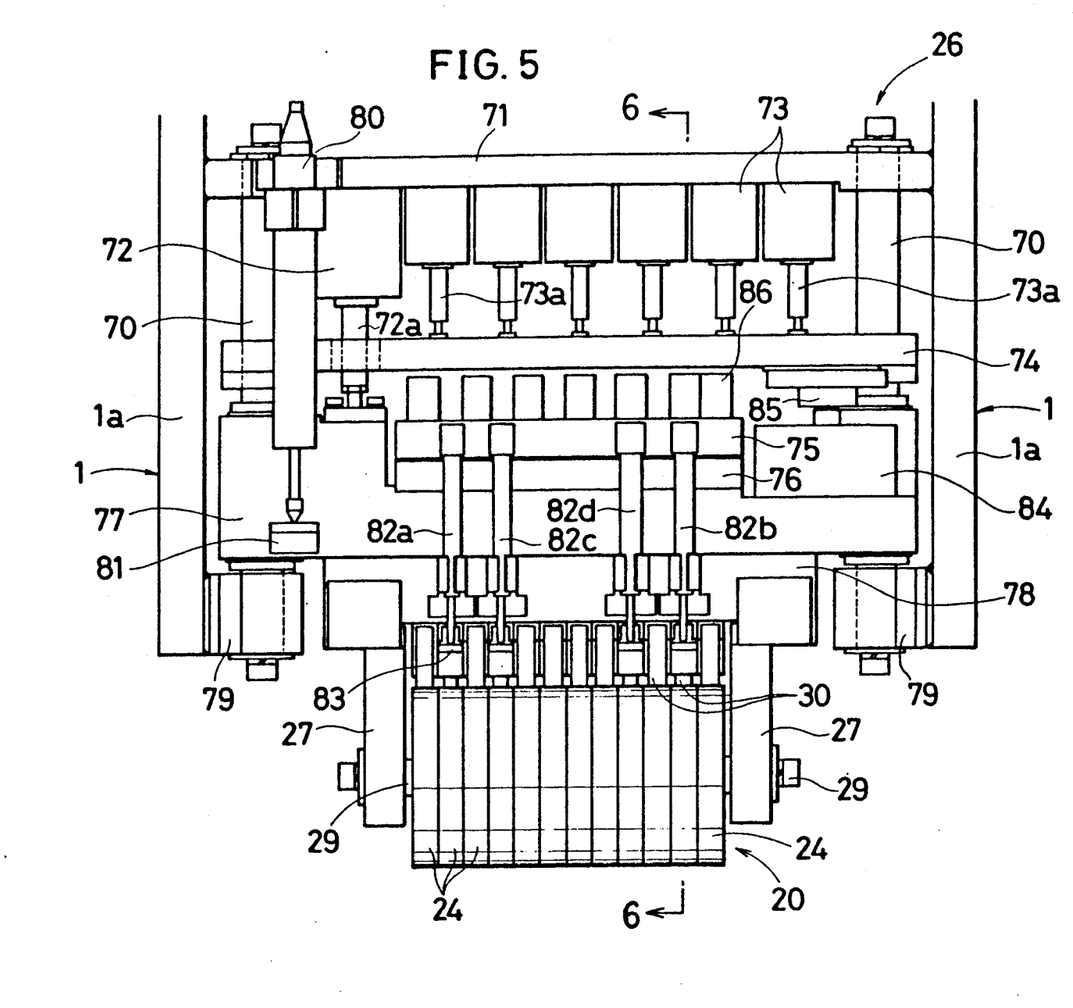
FIG. 5 is an elevational view showing a presser roller and a mechanism for holding the presser roller.
Figure 6:
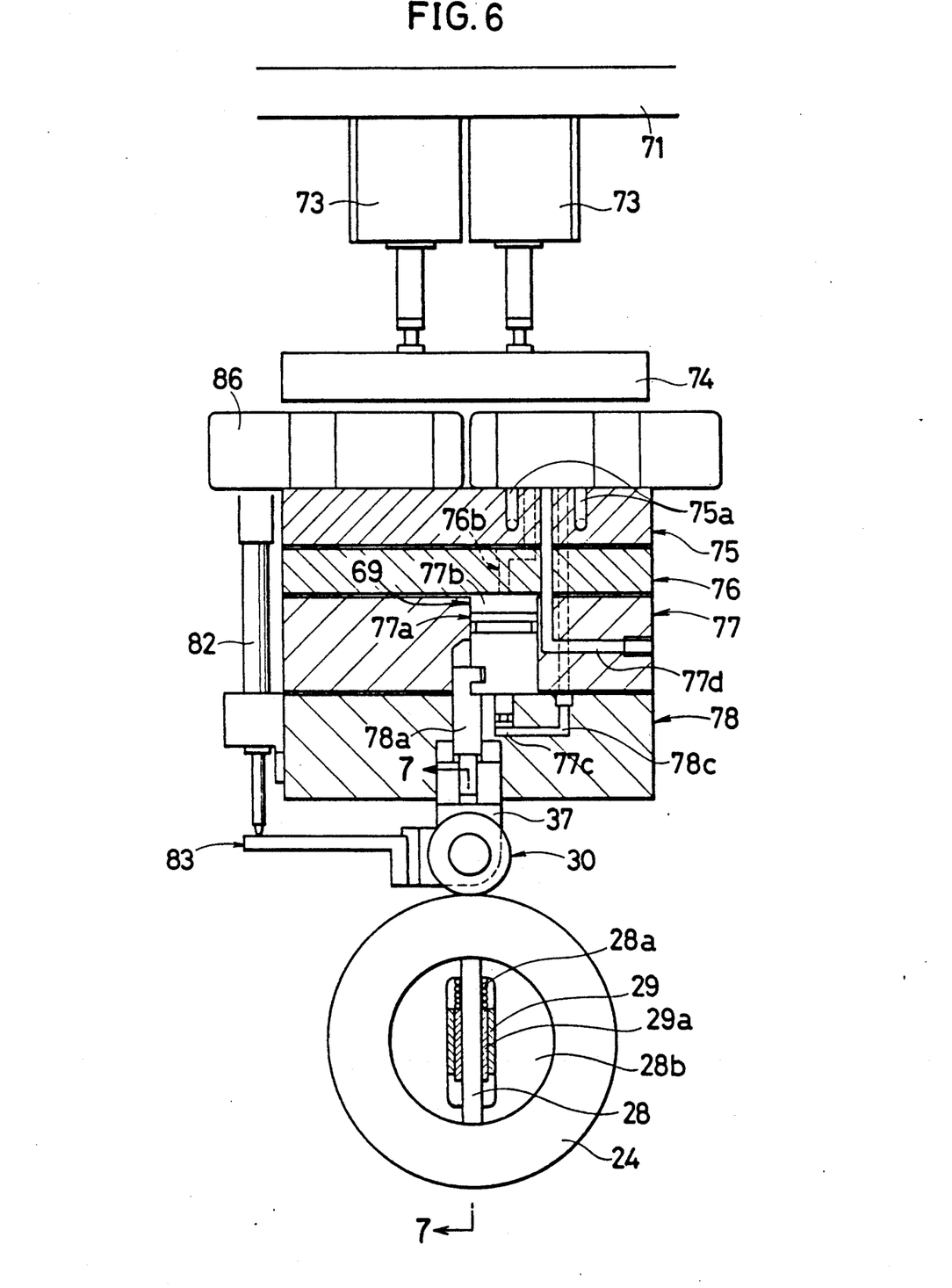
FIG. 6 is a sectional view taken along the line 6—6 in FIG. 5.
Figure 7:
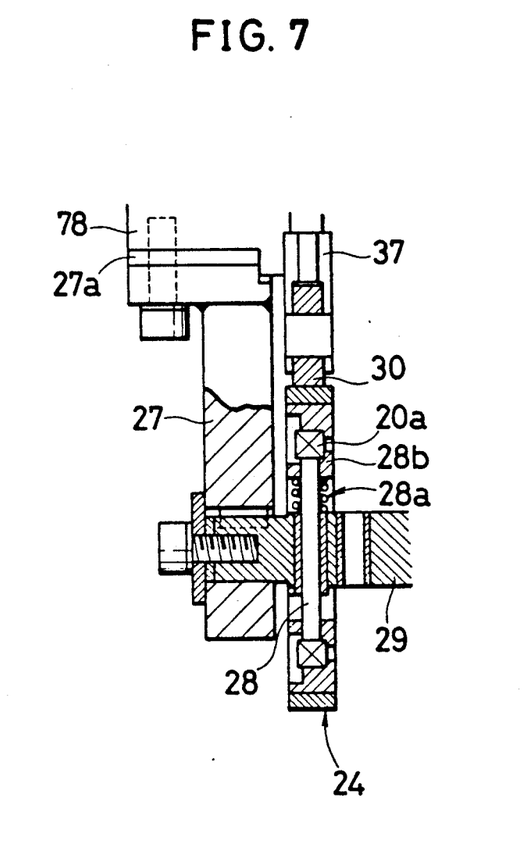
FIG. 7 is a sectional view taken along the line 7—7 in FIG. 6.

FIGS. 5 to 7 show a structure of the roller carrying device 26 of the tape affixing head 1. The tape affixing head 1 has a pair of opposite side plates 1a. The roller carrying device 26 is disposed between them. The roller carrying device 26 is supported by a combination of a holding plate 71 bridged between upper portions of the side plates 1a, brackets 79 mounted on respective lower portions of the same, guide bars held by the holding plate 71 and the brackets 79.

Further, a plurality of pressurizing cylinders 73 and weight canceling cylinders 72 are attached on the underside of the holding plate 71. Although the drawing shows only the pressurizing cyliners 73 and weight canceling cylinder 72 provided in the front portion, the same components are symmetrically provided in the rear portion. The lower ends of piston rods 73a of the pressurizing cylinders 73 are pressed against a pressure plate 74. The pressure plate 74 is slidable vertically along the guide bars 70 extending through the opposite end portions thereof. Under the pressure plate 74 is disposed a block 77 which is connected to a piston rods 72a of the weight canceling cylinders 72. The block 77 is slidable vertically along the guide bars 70 extending through the opposite end portions thereof.

On the block 77 are placed other blocks 76 and 75 on which solenoid operated valves 86 are placed. On the opposite side portions of the block 77 are placed load cells 84. Load cell seats 85 are attached on the underside of the pressure plate 74 so as to face the load cells 84. Drawings shows only the load cell placed on one side. Another load cell is symmetrically provided on the other side of the block 77. Consequently, the load from the pressure plate 74 is transmitted to the block 77 via the load cells 84.

To the underside of the block 77, another block 78 is attached. Brackets 27 for carrying the presser roller 20 are attached to the block 78 by spacers 27a. The presser roller 20 consists of a plurality of roller members 24 disposed widthwise. A shaft 29 for supporting the roller members 24 has the opposite ends unrotatably held by the brackets 27. In each roller member supporting portion, a guide 29a is fixed to the supporting shaft 29. A guide bar 28 is vertically movably passed through the guide 29a. The opposite (upper and lower) ends of the guide bar 28 are fixedly attached to inner roller member 28b. The roller members 24 is rotatably mounted on the outer circumference of the inner roller member 28b with a bearing 20a. A spring 28a is provided between the inner roller member 28b and the supporting shaft 29 so as to apply an upward force to the roller member 24.

A bearing 30 is pressed on the top portion of the roller member 24. A member 37 for holding the bearing 30 is connected to an actuating member 78a which is slidably mounted in the block 78. A piston member 77a of a roller actuating cylinder 69 is further connected to an upper portion of the actuating member 78a. The piston member 77a is placed in a cylinder chamber of the block 77. An upper chamber 77b and a lower chamber 77c are respectively communicated with passages 76b and 78c which are formed in the blocks 75 to 78. The passages 76b, 78c are switchably communicated with a passage 77d connected to a fluid source not shown and a drainage passage 75d by the solenoid operated valve 86.

A sensor 80 is mounted on the above mentioned holding plate 71. The vertical position of the block 77 relative to the tape affixing head 1 is measured by contact of the tip of the sensor 80 with a guage block 81 mounted on the block 77.

Furthermore, a guage block 83 is attached to the holding member 37 with projecting in a lateral direction. The forward end portion of the gauge block 83 comes into contact with the tip of a sensor 82 mounted on the block 78, so that the vertical position of the bearing 30, or the vertical position of the roller member 24 is measured. The sensor 82 comprises a plurality of sensors 82a, 82b, 82c and 82d.

Figure 8:
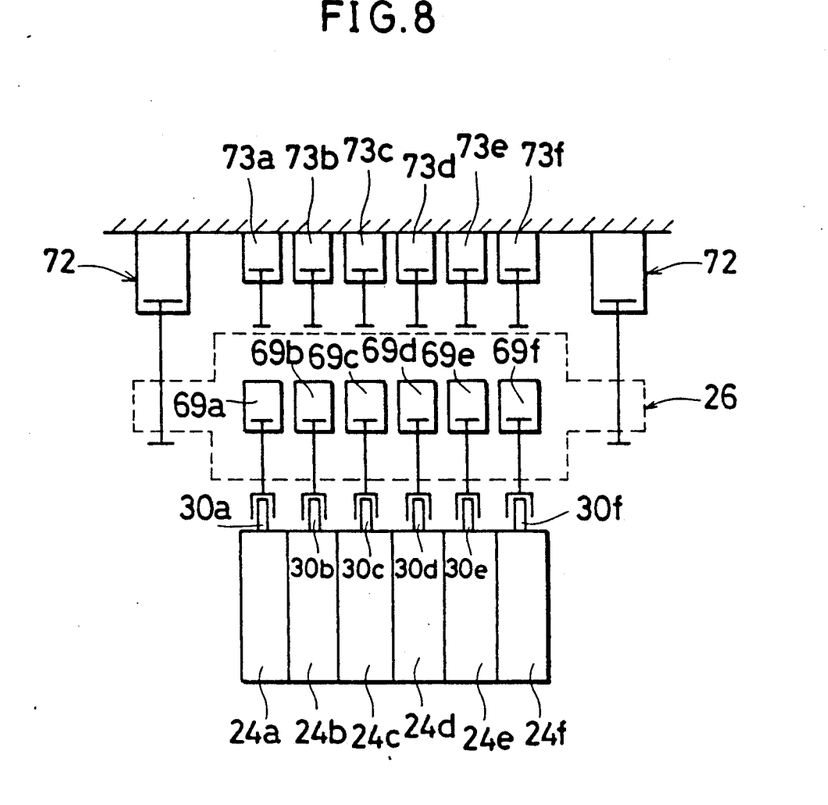
FIG. 8 is a diagram illustrating a relation between the holding mechanism and roller members of the presser roller.

The pressurizing cylinders 73 and the roller actuating cylinders 69 are provided so as to correspond to the roller members 24 of the presser roller 20 respectively. As shown in FIG. 8, a roller member 24a has corresponding members of a bearing 30a in pressed contact with the member 24a, a roller actuating cylinder 69a and a pressurizing cylinder 73a. A roller member 24b has corresponding members of a bearing 30b, a roller actuating cylinder 69b and a pressurizing cylinder 73b. Similarly, roller members 24c to 24f have respective corresponding members of bearings 30c to 30f, roller actuating cylinders 69c to 69f and pressurizing cylinder 73c to 73f in series. The pressurizing cylinders 73a to 73f correspond to the roller actuating cylinders 69a to 69f and always provide a constant pressing forces to roller members 24 cooperatively with roller actuating cylinders respectively.

An operation of the apparatus according to the invention will now be described. The block 77 carries the blocks 75, 76 and 78, the load cells 84, the pressure plate 71, the solenoid operated valves 86, the presser roller 20 and the like. The block 77 is pulled up by the weight canceling cylinder 72 through the piston rod so that the weights of the above members are not applied to an adhesion form. This enables accurate control of the pressing force of the presser roller 20. In this state, the pressurizing cylinders 73 exert a pressurizing force on the block 77 through the pressure plate 74 and the load cells 84.

On the other hand, pressurized fluid is supplied from the passage 77d via the solenoid operated valves 86 to the upper chamber 77b so that a predetermined downward force is applied to the bearing 30 through the piston member 77a, the actuating member 78a and the bearing holding member 37 to press down the roller member 24 of the presser roller 20.

The diameter of cylinders or other items are determined in such a way that the pressurizing cylinders 73 and the roller actuating cylinders 69 have a predetermined relation in pressurizing force (described below), so as to enable an operation described below.

Then, X-axis, Y-axis, Z-axis, A-axis and C-axis servomotors 91, 93 and 95, and 15 are actuated to press the presser roller 20 at the forward end of the tape affixing head 1 against the adhesion form (not shown) and to move the tape affixing head 1 along a programmed path over the surface of the adhesion form while the tape 10 is fed from the supply reel 2 at a predetermined rate and tension, whereby the tape is affixed on the surface.

The surface of a usual adhesion form has various contours. The moving path of the tape affixing head 1 is programmed in accordance with the contours. However, it is inevitable that programmed contours are different from actual ones because of an error caused in manufacturing the adhesion form. Accordingly, when a tape is affixed on the adhesion form, the difference is canceled by utilizing a stroke of pressurizing cylinders 73 with the presser roller 20 being pressed against the surface of the adhesion form. Further, independent vertical movements of the roller members 24 enable the tape 10 to be uniformly pressed and entirely affixed on the surface.

Figure 1A:
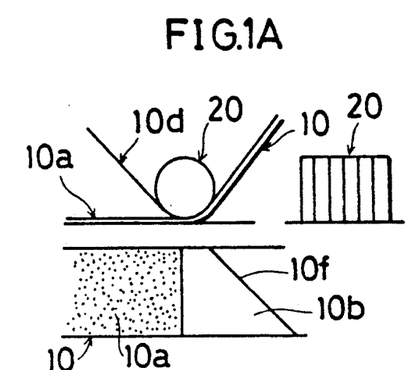
FIGS. 1A-1G are diagrams illustrating manners for affixing an end edge portion of a tape using an apparatus according to the present invention.
Figure 1B:
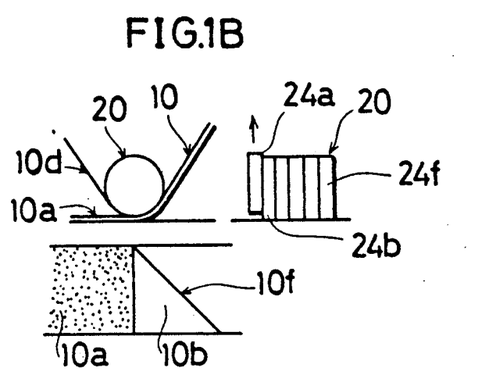

As shown in FIGS. 1A to 1G, in a case that an end edge 10f of the tape 10 to be affixed has an inclination relative to an affixing direction of the tape 10, the tape 10 is affixed to the very tip by the following way. As shown in FIG. 1A, all the roller members press the tape 10 to a portion before the end edge which is represented by 10a. When the presser roller 20 reaches one side point of the end edge 10f or one side of an unaffixed triangle region 10b, the roller member 24a, which is at one side end position of the presser roller 20 or most near the end edge 10f, is raised as shown in FIG. 1B.

As shown in FIGS. 6 to 8, the roller member 24a is raised by the roller actuating cylinders 69. Specifically, a piston 77a is raised, and the bearing 30a is raised through an actuation member 78a. Consequently, the roller member 24a rises due to a force of a spring 28a. At this time, the pressurizing force of the pressurizing cylinder 73 corresponding to the roller actuating cylinder 69 is removed. Consequently, the pressing force of the presser roller 20 decreases, that is, the sum of pressurizing forces the remaining roller members 24b to 24f. Accordingly, the pressing force for unit area of the tape 10 is kept constant.

Figure 1C:
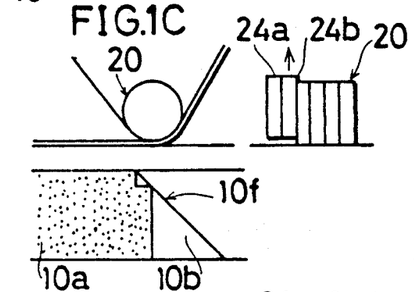
Figure 1D:
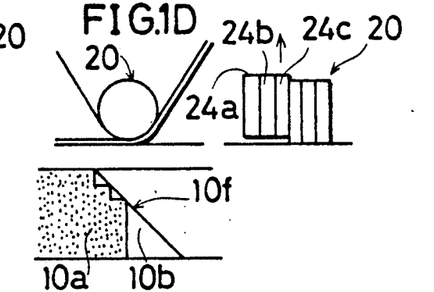
Figure 1E:
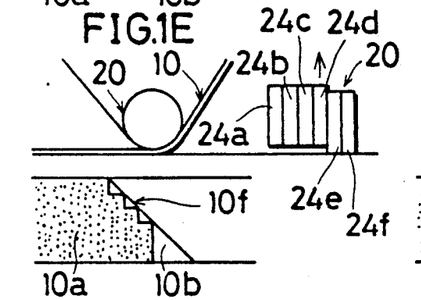
Figure 1F:
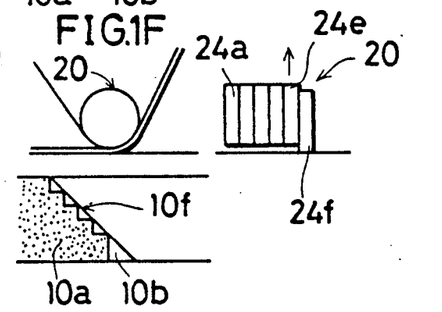
Figure 1G:
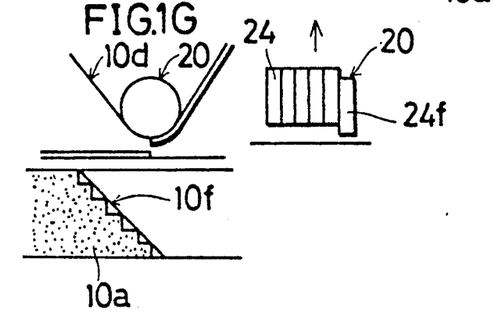

Thus, the tape 10a is pressed by the roller members 24b to 24f other than the roller member 24a. Consequently, a portion corresponding to the roller member 24a is not affixed. The roller members 24b to 24f press the end portion until the roller member 24b reaches the end edge 10f as shown in FIG. 1C. The backing paper 10d is continuously wound on the take-up reel 25. Then, the roller member 24b next to the roller member 24a is raised, and the remaining roller members 24c to 24f press the tape as shown in FIG. 1D. Similarly, the roller members 24c, 24d, 24e are raised one after another, and the tape is affixed as shown in FIGS. 1E, 1F and 1G. Finally, the tape affixing head 1 is raised to complete adhesion of the end portion having the inclined end edge 10f.

Figure 9:
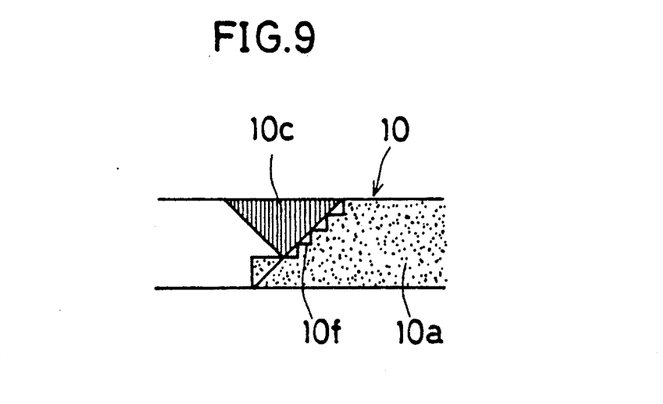
FIG. 9 is a diagram illustrating another manners for affixing an end edge portion of a tape using the apparatus of the present invention.

In a case that the affixing is started from an inclined end edge of the tape 10, steps reverse to the above-mentioned steps are performed. Specifically, as shown in FIG. 9, not to press a needless tape piece 10c remained near an inclined end edge 10f, roller members corresponding to a portion opposite to the tape piece 10c are lowered to start the affixing. Then, the remaining roller members are lowered on after another in accordance with the end edge 10f so that pressed area gradually increases. Finally, all the roller members press the tape 10.

As mentioned above, the affixing is performed leaving the needless tape piece 10c. The needless tape piece 10c is automatically removed by a scraper 3c (shown in FIG. 4).

The above example shows the case in which a tape is affixed on a flat surface of the adhesion form. However, similar procedure is applicable to a case of affixing the tape to a curved surface of the adhesion form. Specifically, the roller members 24, the pressurizing cylinders 73 and the roller actuating cylinders 69 are disposed in series to cooperatively function. A diameter of the respective cylinders and other items are determined in such a way that the relation between pressurizing forces of the cylinders comes to the following.

When the adhesion form has a complicated surface configuration, it is desirable to make the diameter of the presser roller as small as possible to render the presser roller precisely follow a surface having small curvatures. However, a smaller presser roller unavoidably causes the vertical stroke of each roller member small due to a limited space. The difference between a programmed adhesion form and an actual adhesion form, which is caused due to a manufacturing error, is usually larger than the vertical stroke of each roller member. Accordingly, the difference is canceled with the vertical stroke of a pressurizing cylinder as previously mentioned. Specifically, the respective pressurizing forces of the roller actuating cylinder 69 and the pressurizing cylinder 73 are set so that when the tape affixing head 1 is lowered to press the surface (flat surface) of the adhesion form with the presser roller 10, the roller actuating cylinder 69 remains at the lowermost position of its stroke but the pressurizing cylinder 73 is displaceable. If the roller actuating cylinder 69 is displaced prior to the displacement of the pressurizing cylinder 73 and consequently reaches the upper most position of its stroke, the above-mentioned affixing can not be executed in which a tape end portion having an inclined end edge is affixed in accordance with the inclined end edge, and an end portion of a tape of the next process is pressed at the same time. Accordingly, the pressurizing forces of the cylinders are set so as to satisfy following equation.

$$Fa > Fb$$

where Fa is the pressurizing force of the roller actuating cylinder 69 and Fb is the pressurizing force of the pressurizing cylinder 73.

When the adhesion form has a curved surface, as previously mentioned, the roller members 24 are made to vertically move independently of one another in accordance with the curved surface to uniformly press the tape on the surface. Specifically, when the tape affixing head is lowered to press the presser roller on the curved surface of the adhesion form, roller members excepting one roller member are moved up so as to follow the curved surface of the adhesion form. Assuming the number of roller members is N, the pressurizing forces of the cylinders are set so as to satisfy the following equation.

$$(N-1) \times Fa < N \times Fb$$

Accordingly, the pressurizing forces of the roller actuating cylinder 69 and the pressurizing cylinder 73 are determined so as to satisfy the following equation which is obtained from the foregoing equations.

$$Fax(N-1)/N < Fb < Fa$$

It should be noted that the foregoing equations have a premise that the weight canceling cylinder 72 pulls up the roller carrying member 26, and therefore the weight of the roller carrying member 26 is not given to the tape pressing force.

When the pressurizing force of each cylinder is set as described above, even if the adhesion form have curved surfaces, the tape can entirely be pressed and affixed on the curved surface and uniformly pressed and affixed an end portion having an inclined end edge on the curved surface. Specifically, when the roller member 24a is raised as shown in FIG. 1B, the number of pressing roller members is (N−1). Also, the following equation is obtainable.

$$(N-2)/(N-1) < (N-1)/N$$

Thus, the following equation can be seen.

$$Fax(N-2)/(N-1) < Fb < Fa$$

Accordingly, (N−1) roller members can be uniformly press the tape on the curved surface the same as the previous pressing.

In the above embodiment, the pressurizing cylinders 73 are provided so as to correspond to respective roller members 24 to facilitate control. However, the number of pressurizing cylinders 73 is not limited to the same number as the roller members, and therefore one or an appropriate number of cylinders may be used. The pressurizing force may be controlled by an electropneumatic converter or the like. Weight cancellation of the roller carrying member may be carried out using a spring or the like instead of the weight canceling cylinder. However, there is a likelihood that when the roller carrying member is vertically moved to cancel the difference between a programmed adhesion form and an actual adhesion form, the pressing force of the spring (or the pulling-up force) is varied and the tape pressing force receives its variation.

As has been described, according to the present invention, a tape can be entirely affixed on a curved surface of an adhesion form because of independent vertical movements of roller members of a presser roller. Also, only required roller members can be made to press the tape by moving up and down the roller members through actuation of roller actuating cylinders. Accordingly, an end portion having an inclined end edge relative to the affixing direction can be effectively and assuredly pressed and affixed on surfaces of the adhesion form having curved surfaces.

What is claimed is:

1. A tape affixing head for an automatic tape affixing apparatus in which the tape affixing head is moveable in multiple directions for affixing tape on an affixing surface, said tape affixing head comprising:
   a structure means mounting a tape supply reel and a take-up reel for said tape;
   a roller carrier means moveably mounted on said structure means, said carrier means carrying a shaft, a plurality of rotatable and transversely moveable roller means on said shaft such that each of said roller means is separately transversely moveable relative to said shaft in a direction perpendicular to the axis of said shaft;
   first cylinder means on said carrier means operable to apply a first pressing force to each of said roller means to thereby individually press said roller means against said affixing surface; and
   second cylinder means operably disposed between said structure means and said carrier means for applying a second pressing force to said carrier means such that said second cylinder means is thereby operable to apply said second pressing force simultaneously to all of said roller means while said first cylinder means applies said first pressing force to individual roller means.

2. A tape affixing head according to claim 1 further comprising weight cancelling means between said structure means and said carrier means for applying a force to said carrier means in a direction opposite to said second pressing force of said second cylinder means, said weight cancelling means being operable to apply its force in an amount equal to the weight of said carrier means.

3. A tape affixing head according to claim 1, wherein each of said first cylinder means comprises first control means for individually controlling the operation of each of said first cylinder means, said second cylinder means comprising second control means for controlling the operation of said second cylinder means, said second control means being operable in response to variations in the total pressure applied to said plurality of pressure rollers by said plurality of first cylinder means to vary said second pressing force to maintain a substantially constant pressure force per unit area of engagement between said roller means and said affixing surface.

4. A tape affixing head according to claim 3, wherein said first control means is operable to selectively provide termination of said first pressing force of each of said roller means such that the respective roller means is no longer pressured toward said affixing surface.

5. A tape affixing head according to claim 4, wherein said second control means is responsive to said termination of said first pressing force for each roller means and is operable to control said second cylinder means to reduce said second pressing force an amount related to the number of roller means no longer pressed toward said affixing surface to thereby maintain a substantially constant pressure force per unit area of engagement between said roller means and said affixing surface.

6. A tape affixing head according to claim 1, wherein each of said roller means comprises biasing means biasing each roller means vertically upwardly such that each roller means is moved vertically upwardly by said biasing means away from said affixing surface when the first pressing force of each first cylinder means is terminated.

7. A tape affixing head according to claim 3, wherein said first control means comprises solenoid valves mounted on said carrier means, said second cylinder means comprising a plurality of cylinders each having an operating piston and each operably disposed between said structure means and said carrier means.

8. A tape affixing head according to claim 1, wherein said structure means comprises operable means for moveably mounting said structure means on said affixing apparatus.

9. A tape affixing head according to claim 1, wherein each of said first cylinder means comprises a cylinder structure in which a piston is operable and an actuating means operably disposed between said piston and said roller means, said actuating means comprising an actuating member rotatably supporting a bearing means which is operably engageable with the outer periphery of said roller means.

10. A tape affixing head according to claim 9, wherein said structure means comprises guide bars, said carrier means comprising block means slidably mounted on said guide bars, said cylinder structure being disposed in said block means.

11. A tape affixing head according to claim 10, wherein said first cylinder means comprises a plurality of solenoid means on said block means and operable to control operation of each of said first cylinder means.

12. A tape affixing head according to claim 10, wherein said structure means comprises a holding plate fixed to said guide bars, said carrier means comprising a pressure plate slidable on said guide bars, and second cylinder means being operably connected between said holding plate and said pressure plate.

13. A tape affixing head according to claim 12 further comprising weight cancelling cylinder means operably disposed between said holding plate and said block means.

14. A tape affixing apparatus according to claim 12 further comprising load cell means operably disposed between said pressure plate and said block means.

15. Automatic tape affixing apparatus comprising:
a tape affixing head for affixing tape onto an affixing surface;
multiple axis mounting means mounting said tape affixing head for movement on and about multiple axes;
said tape affixing head comprising a structure means mounting a supply reel and a take-up reel;
a roller carrier means moveably mounted on said structure means, said carrier means carrying a shaft, a plurality of rotatable and transversely moveable roller means on said shaft such that each of said roller means is separately transversely moveable relative to said shaft in a direction perpendicular to the axis of said shaft;
first cylinder means on said carrier means operable to apply a first pressing force to each of said roller means to thereby press said roller means against said affixing surface; and
second cylinder means operably disposed between said structure means and said carrier means for applying a second pressing force to said carrier means such that said second cylinder means is thereby operable to apply said second pressing force simultaneously to all of said roller means while said first cylinder means applies said first pressing force to individual roller means.

16. Automatic tape affixing apparatus according to claim 15 comprising operable drive means operably disposed between said multiple axis mounting means and said structure means for moving said structure means relative to said multiple axis mounting means.

* * * * *